United States Patent
Zhou et al.

(10) Patent No.: US 12,207,186 B2
(45) Date of Patent: Jan. 21, 2025

(54) DYNAMIC CELL FUNCTIONALITY DETERMINATION IN L1/L2 BASED MOBILITY

(71) Applicant: QUALCOMM Incorporated, San Diego, CA (US)

(72) Inventors: Yan Zhou, San Diego, CA (US); Qian Zhang, Basking Ridge, NJ (US); Jelena Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 17/443,819

(22) Filed: Jul. 27, 2021

(65) Prior Publication Data

US 2022/0039006 A1    Feb. 3, 2022

Related U.S. Application Data

(60) Provisional application No. 63/058,442, filed on Jul. 29, 2020.

(51) Int. Cl.
*H04W 48/20* (2009.01)
*H04W 24/10* (2009.01)
*H04W 48/16* (2009.01)
*H04W 68/00* (2009.01)

(52) U.S. Cl.
CPC ........... *H04W 48/20* (2013.01); *H04W 24/10* (2013.01); *H04W 48/16* (2013.01); *H04W 68/005* (2013.01)

(58) Field of Classification Search
CPC ..... H04W 48/20; H04W 24/10; H04W 48/16; H04W 68/005; H04W 76/15; H04L 5/001; H04L 5/0098
See application file for complete search history.

(56) References Cited

U.S. PATENT DOCUMENTS

2019/0116585 A1* 4/2019 Chakraborty ......... H04L 5/0098
2019/0124558 A1* 4/2019 Ang ........................ H04L 5/001

FOREIGN PATENT DOCUMENTS

| CN | 110620606 A | * 12/2019 | ........... H04B 7/0413 |
| KR | 20150012988 A | * 2/2015 | |

* cited by examiner

*Primary Examiner* — Said M Elnoubi
(74) *Attorney, Agent, or Firm* — Arent Fox LLP /Qualcomm Incorporated

(57) ABSTRACT

A base station may select an active set of serving cells for a user equipment (UE) from a configured cell set of the UE. The base station may select a cell of the active set of serving cells to perform a primary cell (PCell) function for the UE. The base station may select the cell and transmit an indication of the selected cell to the UE in layer 1 or layer 2 signaling, or the base station may select the cell using a common rule and the UE may select the cell using the common rule. Upon determining the cell, the UE may perform the PCell function with the cell.

19 Claims, 10 Drawing Sheets

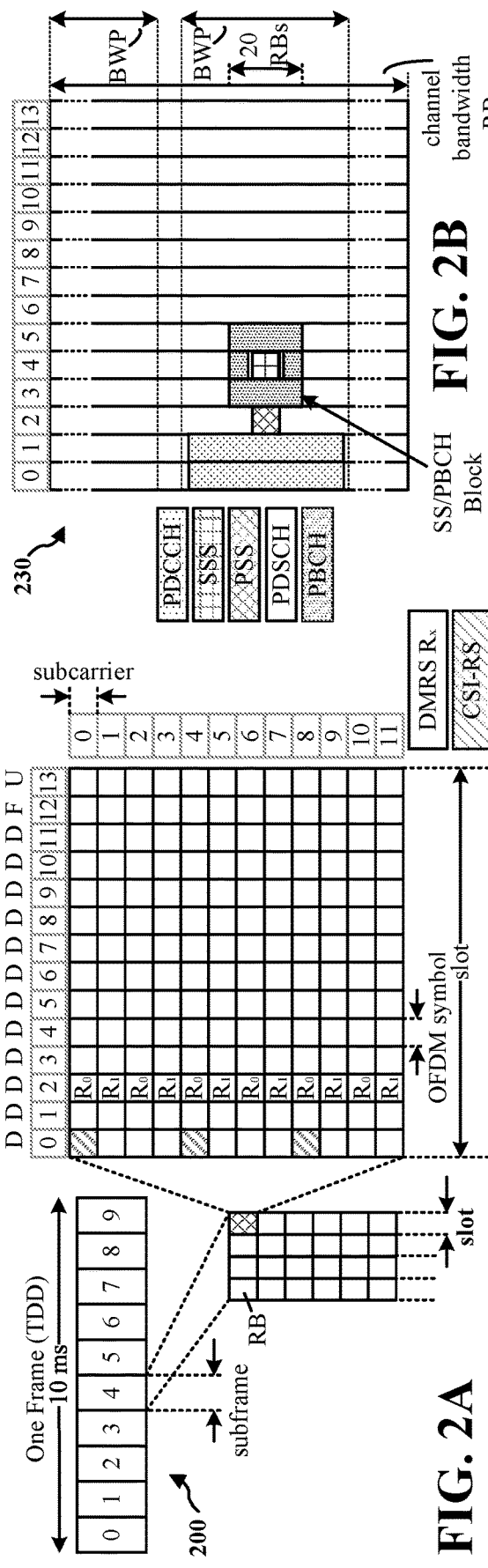
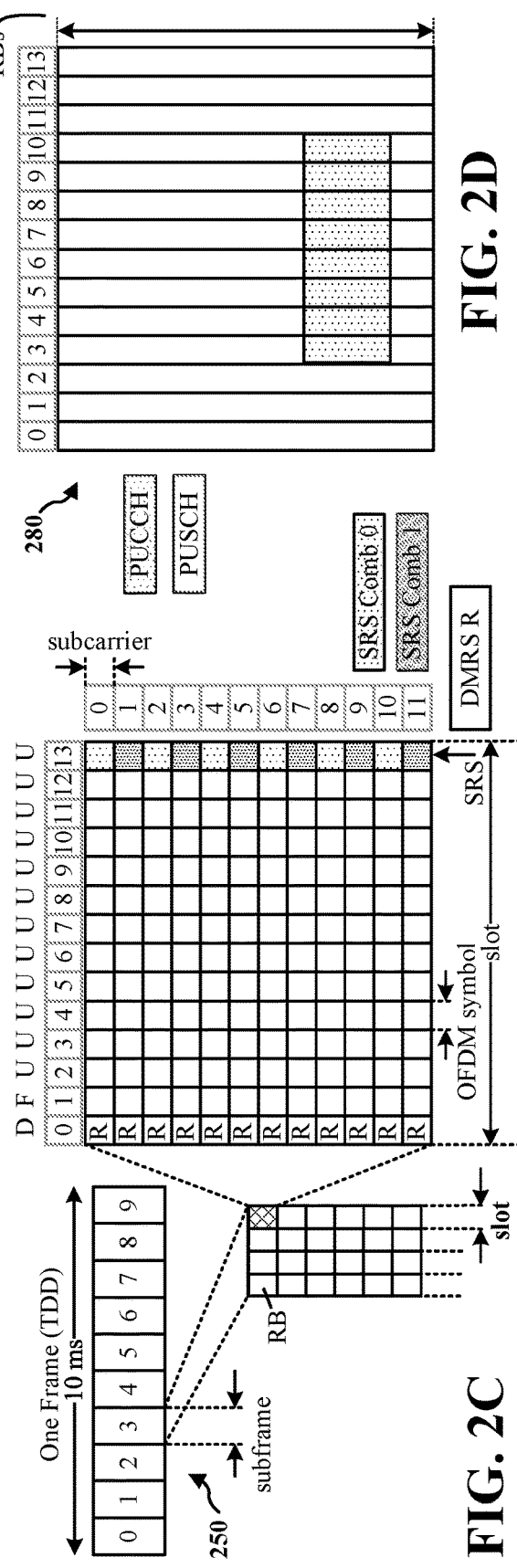
FIG. 2A
FIG. 2B
FIG. 2C
FIG. 2D

DYNAMIC CELL FUNCTIONALITY DETERMINATION IN L1/L2 BASED MOBILITY

CROSS REFERENCE TO RELATED APPLICATION(S)

This application claims the benefit of U.S. Provisional Application Ser. No. 63/058,442, entitled "DYNAMIC CELL FUNCTIONALITY DETERMINATION IN L1/L2 BASED MOBILITY" and filed on Jul. 29, 2020, the disclosure of which is expressly incorporated by reference herein in its entirety.

BACKGROUND

Technical Field

The present disclosure relates generally to communication systems, and more particularly, to a wireless communication system utilizing a network of cells to communicate with a user equipment.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may determine an active set of serving cells from a configured cell set; determining a cell of the active set of serving cells configured to perform a primary cell (PCell) function for the UE based on layer 1 or layer 2 signaling from a base station or based on a common rule; and perform the PCell function with the determined cell.

In some aspects, the UE may receive layer 1 reference signals from the cells of the configured cell set, wherein the active set of serving cells is determined from the configured cell set based on measurements of the received layer 1 reference signals.

In some aspects, the UE may transmit a measurement report to the base station, the measurement report being based on the received layer 1 reference signals; receive an indication of the active set of serving cells from the base station; and determine the active set of serving cells based on the indication.

In some aspects, the cell may be a physical uplink control channel (PUCCH) secondary cell (SCell) serving the UE, and the PCell function may be transmitting a PUCCH to the PUCCH SCell.

In some aspects, cell may be a primary cell (PCell) serving the UE, and the PCell function may be transmitting a physical uplink control channel to the cell, performing a random access channel procedure with the cell, receiving a paging message from the cell, receiving system information from the cell, performing beam forming recovery with the cell, or performing radio link monitoring with the cell.

In some aspects, the UE may receive a configuration for each serving cell of the active set of serving cells, wherein the UE may perform the PCell function with the cell based on the configuration for the cell.

In some aspects, determining the cell of the active set of serving cells may be based on the layer 1 signaling from the base station.

In some aspects, the UE may receive the layer 1 signaling from the base station, and the layer 1 signaling may include an indicator identifying the cell.

In some aspects, the base station may be configured to configure the active set of serving cells to serve the UE.

In some aspects, determining the cell of the active set of serving cells may be based on the common rule.

In some aspects, the base station may be configured to utilize the common rule to select the cell from the active set of serving cells to perform the PCell function for the UE.

In some aspects, determining the cell of the active set of serving cells based on the common rule may include selecting the cell based on serving cell indices or physical cell identifiers of the cells of the active set of serving cells.

In some aspects, selecting the cell based on the serving cell indices or the physical cell identifiers of the cells of the active set of serving cells may include determining that the cell has the highest serving cell index or physical cell identifier of the active set of serving cells or determining that the cell has the lowest serving cell index or physical cell identifier of the active set of serving cells.

In some aspects, determining the cell of the active set of serving cells may include determining a subset of cells of the active set of serving cells, the subset of cells being the cells of the active set of serving cells with a corresponding configuration for performing the PCell function at the UE;

and selecting the cell from the subset of cells based on the serving cell indices or the physical cell identifiers of the cells of the subset of cells.

In some aspects, the cell may be a physical uplink control channel secondary cell serving the UE, and determining the cell of the active set of serving cells may include determining a subset of cells of the active set of serving cells, the subset of cells being the cells of the active set of serving cells that are not serving as a primary cell for the UE; and selecting the cell from the subset of cells based on the serving cell indices or the physical cell identifiers of the cells of the subset of cells.

In some aspects, the cell may be a physical uplink control channel secondary cell serving the UE, and determining the cell of the active set of serving cells may include determining a subset of cells of the active set of serving cells, the subset of cells being the cells of the active set of serving cells with a corresponding PUCCH resource configuration at the UE; determining a second subset of cells of the subset of cells, the second subset of cells being the cells of the subset of cells that are not serving as a PCell for the UE; and selecting the cell from the second subset of cells based on the serving cell indices or the physical cell identifiers of the cells of the second subset of cells.

In another aspect of the disclosure, a method, a computer-readable medium, and an apparatus are provided. The apparatus may be a base station. The apparatus may determine an active set of serving cells for a user equipment (UE) from a configured cell set for the UE; select a cell from the active set of serving cells to perform a primary cell (PCell) function for the UE based on a common rule, or select the cell from the active set of serving cells to perform the PCell function for the UE and transmit an indication of the cell to the UE through layer 1 signaling; and configure the cell to perform the PCell function for the UE.

In some aspects, the base station may receive a measurement report from the UE, the measurement report being based on layer 1 reference signals received by the UE from the cells of the configured cell set, and the active set of serving cells may be determined from the configured cell set based on the measurement report.

In some aspects, the cell may be a PCell to serve the UE and the PCell function may be receiving a physical uplink control channel from the UE, performing a random access channel procedure with the UE, transmitting a paging message to the UE, transmitting system information to the UE, performing beam forming recovery with the UE, or performing radio link monitoring with the UE.

In some aspects, the base station may transmit a configuration for each serving cell of the active set of serving cells to the UE.

In some aspects, the cell may be a PCell to serve the UE, and configuring the cell to perform the PCell function for the UE may be configuring the cell as the PCell for the UE.

In some aspects, the cell may be a physical uplink control channel (PUCCH) secondary cell (SCell) to serve the UE, the PCell function may be receiving a PUCCH from the UE, and configuring the cell to perform the PCell function for the UE may be configuring the cell as the PUCCH SCell for the UE.

In some aspects, the base station may transmit the indication of the cell to the UE through layer 1 signaling.

In some aspects, the base station may select the cell from the active set of serving cells based on the common rule.

In some aspects, the UE may be configured to utilize the common rule to determine the cell from the active set of serving cells.

In some aspects, selecting the cell from the active set of serving cells based on the common rule may include selecting the cell from the active set of serving cells based on the serving cell indices or the physical cell identifiers of the cells of the active set of cells.

In some aspects, selecting the cell based on the serving cell indices or the physical cell identifiers of the cells of the active set of cells may include determining that the cell has the highest serving cell index or physical cell identifier of the active set of serving cells or determining that the cell has the lowest serving cell index or physical cell identifier of the active set of serving cells.

In some aspects, selecting the cell from the active set of serving cells based on the common rule may include determining a subset of cells of the active set of serving cells, the subset of cells being the cells of the active set of serving cells with a corresponding PCell configuration that the base station has transmitted to the UE; and selecting the cell from the active set of serving cells based on the serving cell indices or the physical cell identifiers of the cells of the active set of cells.

In some aspects, selecting the cell from the active set of serving cells based on the common rule may include determining a subset of cells of the active set of serving cell, the subset of cells being the cells of the active subset of serving cells that the base station has not configured as a PCell for the UE; and selecting the cell from the subset of cells based on the serving cell indices or the physical cell identifiers of the cells of the subset of cells.

In some aspects, selecting the cell from the active set of serving cells based on the common rule may include determining a subset of cells of the active set of serving cells, the subset of cells being the cells of the active set of serving cells with a corresponding physical uplink control channel (PUCCH) resource configuration that the base station has transmitted to the UE; determining a second subset of cells of the subset of cells, the second subset of cells being the cells of the subset of cells that the base station has not configured as a PCell for the UE; and selecting the cell from the second subset of cells based on the serving cell indices or the physical cell identifiers of the cells of the second subset of cells.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G NR frame, DL channels within a 5G NR subframe, a second 5G NR frame, and UL channels within a 5G NR subframe, respectively.

DETAILED DESCRIPTION

Figure 1:
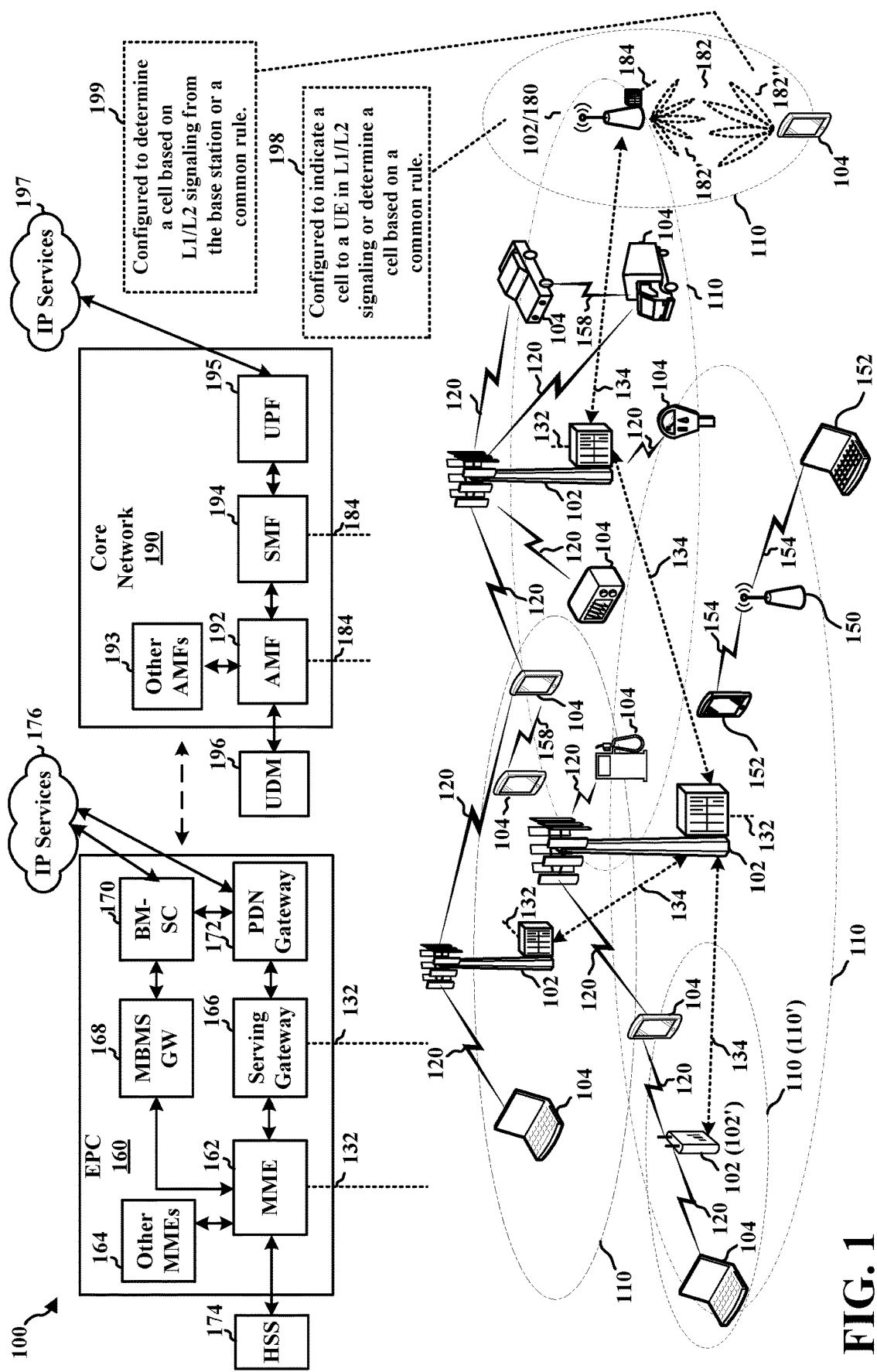
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5 GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Frequency range bands include frequency range 1 (FR1), which includes frequency bands below 7.225 GHz, and frequency range 2 (FR2), which includes frequency bands above 24.250 GHz. Communications using the mmW/near mmW radio frequency (RF) band (e.g., 3 GHz-300 GHz) has extremely high path loss and a short range. Base stations/UEs may operate within one or more frequency range bands. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may be configured to indicate a cell, such as a primary cell or a physical uplink control channel secondary cell, to the UE 104 in L1 or L2 signaling, or to determine a cell based on a common rule (198). In certain aspects, the UE 104 may be configured to determine a cell based on L1 or L2 signaling from the base station 180, or based on a common rule (199). Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to $2^{-\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/negative ACK (NACK) feedback. The PUSCH carries data, and may additionally be used to carry a buffer status report (BSR), a power headroom report (PHR), and/or UCI.

Figure 3:
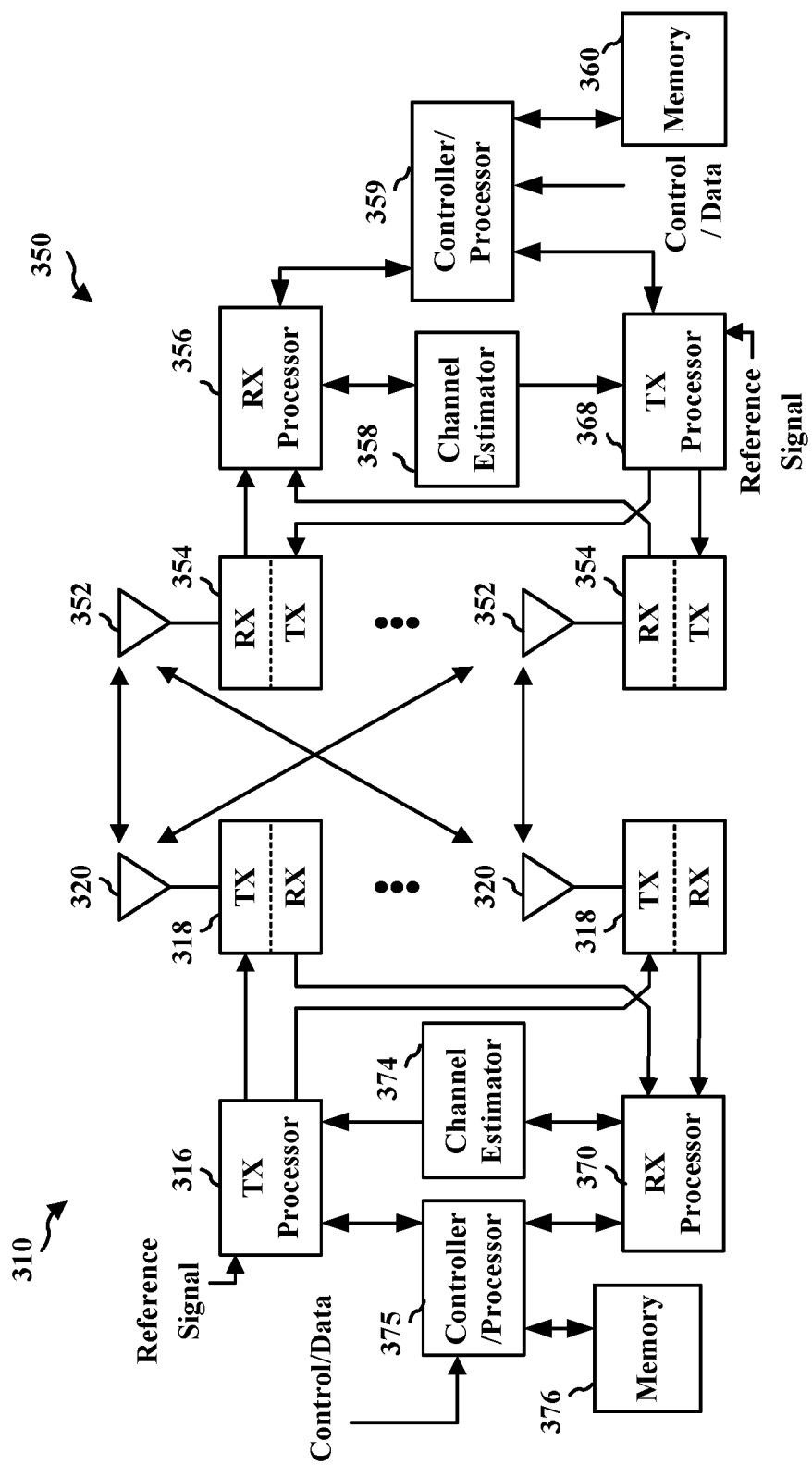
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 6:
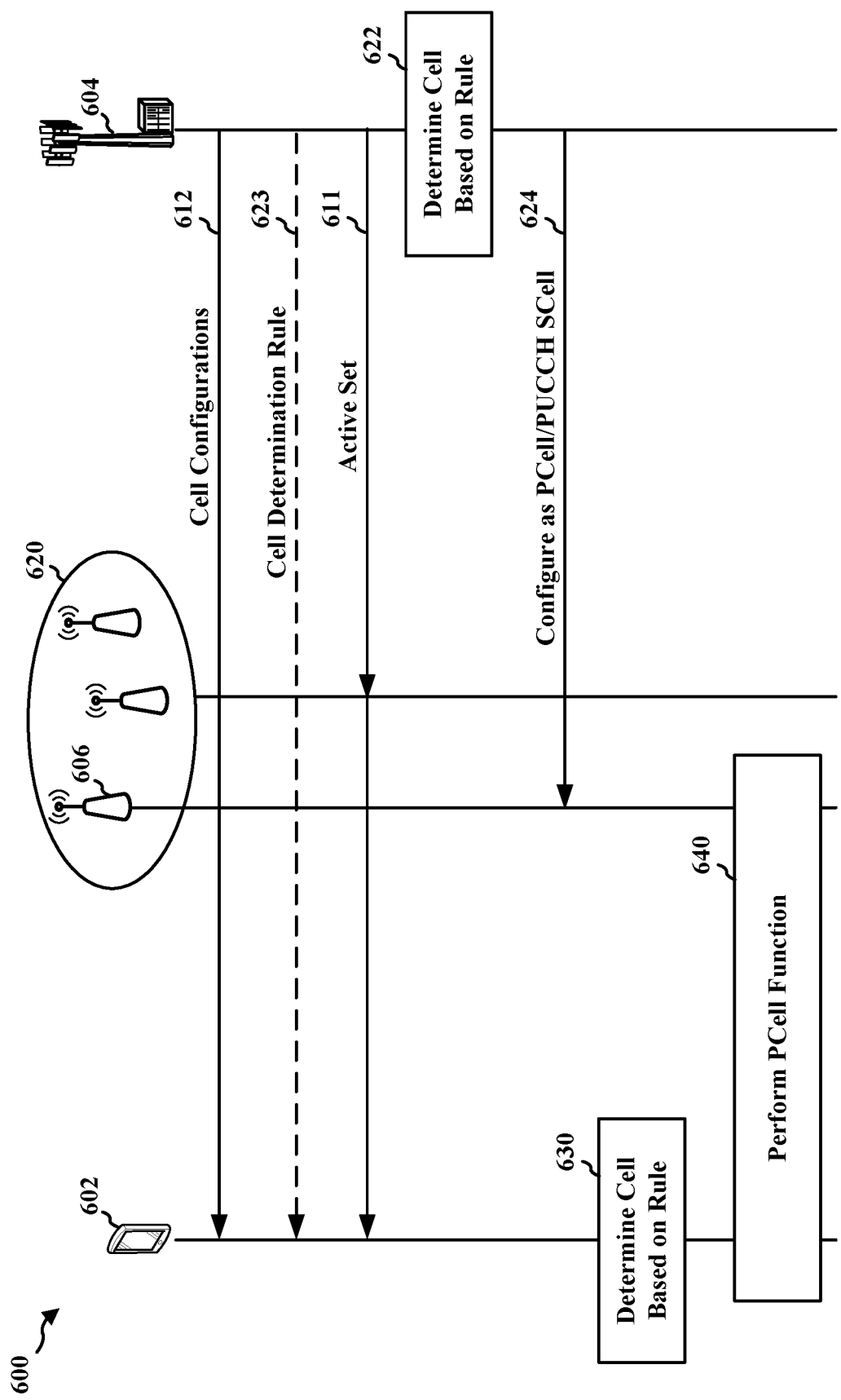
FIG. 6 is a communication flow diagram illustrating a UE determining a cell based on a common rule.
Figure 7:
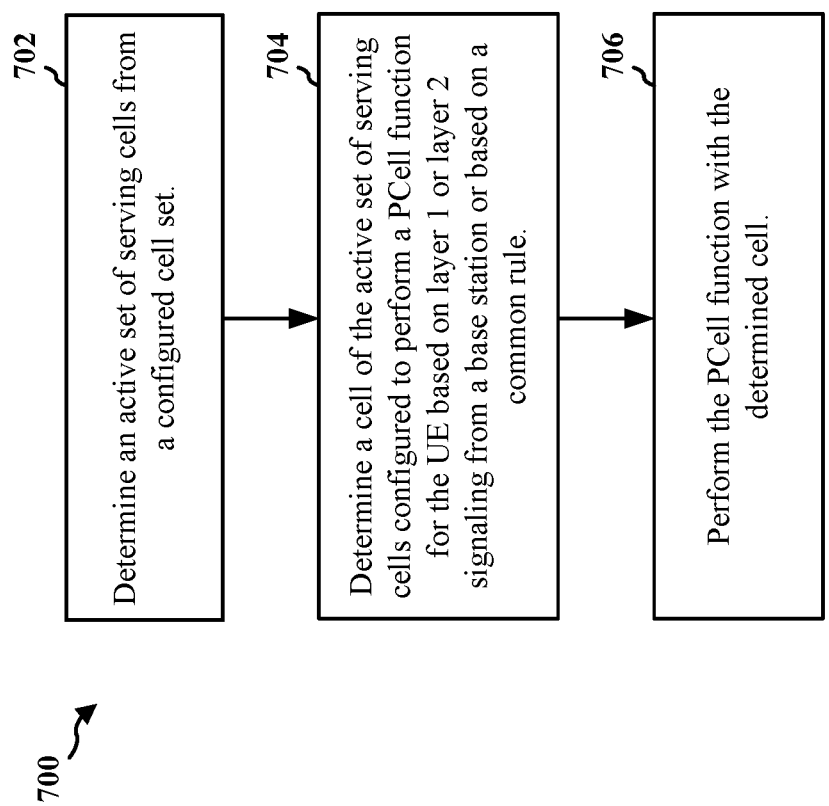
FIG. 7 is a flowchart 700 of a method of wireless communication.

At least one of the TX processor 368, the RX processor 356, and the controller/processor 359 may be configured to perform aspects in connection with 198 of FIG. 1 and/or 630 of FIG. 6 and/or 704 of FIG. 7.

Figure 8:
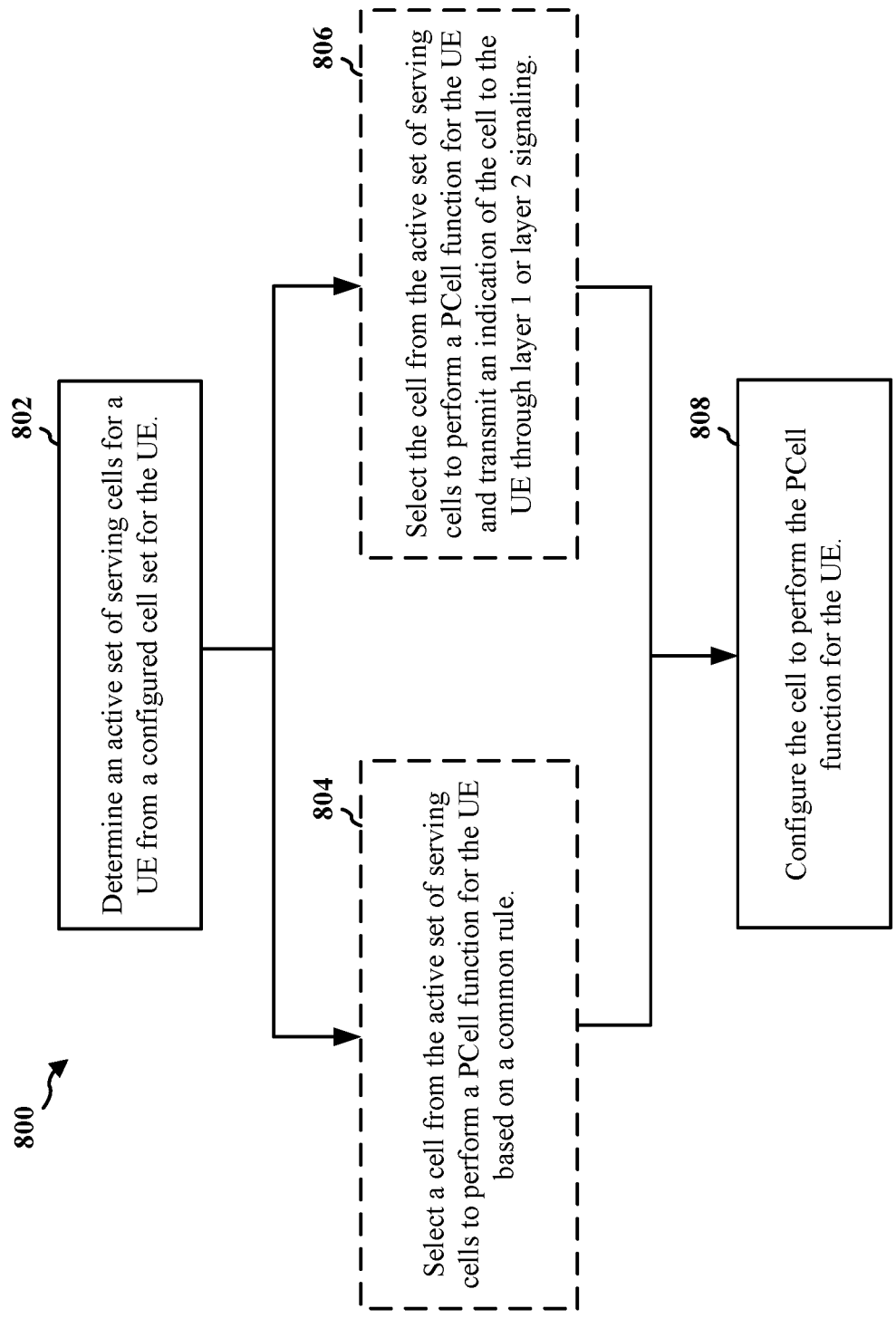
FIG. 8 is a flowchart 800 of a method of wireless communication.

At least one of the TX processor 316, the RX processor 370, and the controller/processor 375 may be configured to perform aspects in connection with 198 of FIG. 1 and/or 622 of FIG. 6 and/or 804 of FIG. 8.

Figure 4:
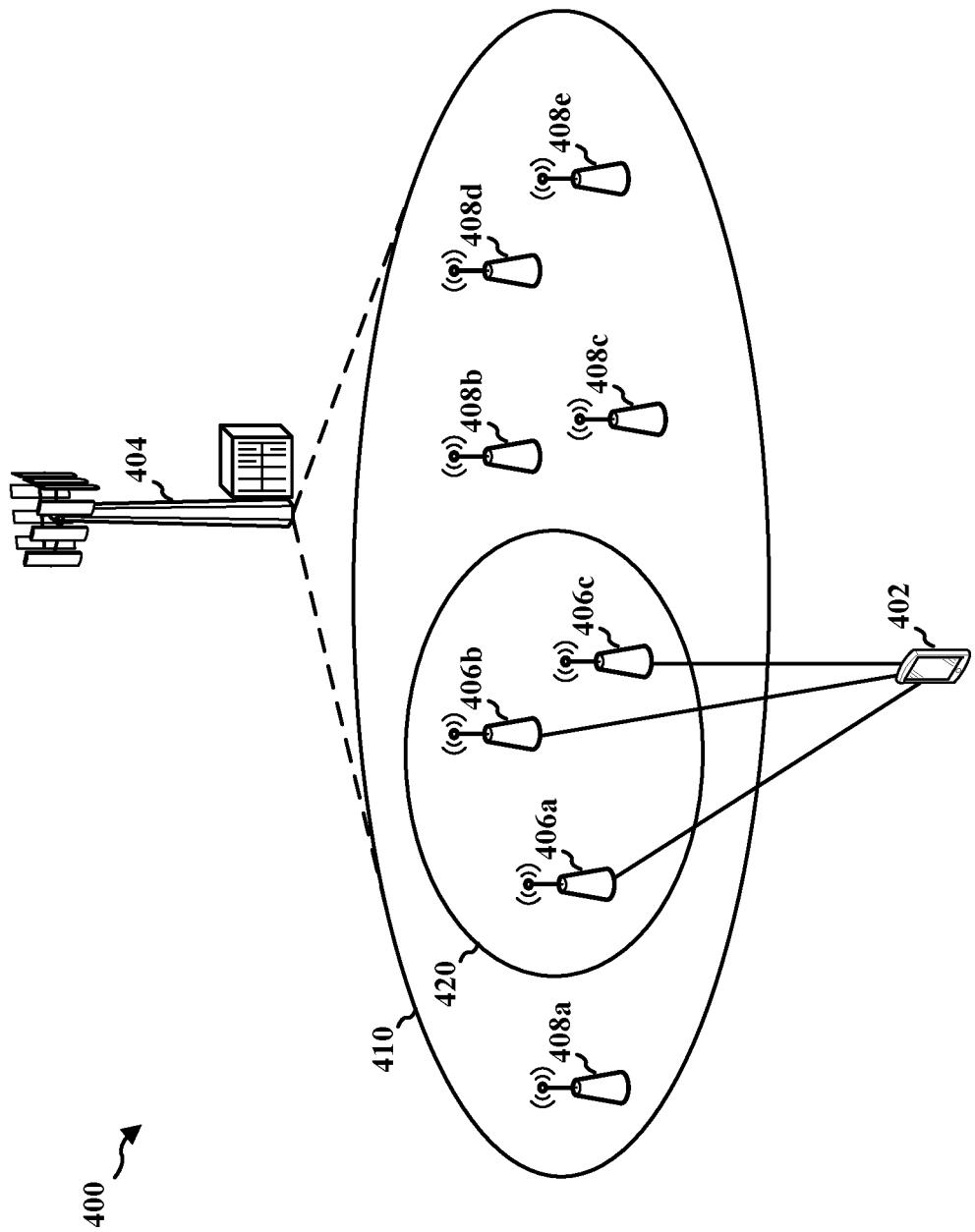
FIG. 4 is a diagram illustrating a wireless network supporting inter-cell mobility.

FIG. 4 is a diagram 400 illustrating a wireless network supporting inter-cell mobility. A base station 404 communicates with a network of cells to communicate with a UE 402. The base station 404 may configure the UE 402 with a configured cell set 410 for inter-cell mobility. The UE 402 may be served by one or more cell of the configured cell set 410. The base station 404 may transmit configurations for each cell of the configured cell set 410 to the UE 402, and the UE 402 may utilize the corresponding configuration when being served by a cell of the configured cell set 410.

In some aspects, the cells of the configured cell set may be associated with serving cell indices to identify the respective cells. In some aspects, the cells of the configured cell set may be associated with physical cell IDs (PCIs), and each cell may be configured with or associated with one or multiple PCIs. Each transmission reception point (TRP) or remote radio head (RRH) associated with a particular PCI of a cell of the configured cell set may transmit the full set of synchronization signal blocks (SSBs) for the network to improve coverage.

The cell or cells serving the UE 402 may be determined based on measurements of layer 1 (L1) signals, such as L1 reference signals (e.g., physical (PHY) layer reference signals) between the UE 402 and the cells of the configured cell group 410. For example, the UE 402 may measure L1 signals (e.g., SSB signals) between the UE 402 and the various cells of the configured cell set 410, and may report L1 measurements corresponding to individual cells to the base station 404. The base station 404 may determine an active set 420 of serving cells for the UE 402, selected from the configured cell set 410, based on the L1 measurements that the UE 402 reports to the base station 404. For example, as illustrated in FIG. 4, cells 406a-c may be in the active set 420, and cells 408a-e may not be in the active set 420. The base station 402 may configure the cells in the active set 420 to serve the UE 402.

The UE 402 may continue to measure the L1 signals of the cells of the configured cell set 410 and report the measurements to the base station 404. Over time, the measurements may change (e.g., as the UE 402 moves within the geographic region covered by the configured cell group 410). The base station 404 may reconfigure which cells are in the active set 420 based on the new measurements, changing which cells are serving the UE 402.

Within the active set 420 of serving cells, a specific cell may be configured to perform a given function with the UE 402. In one example, the base station 404 may configure one cell of the active set 420 to serve as the primary cell (PCell) for the UE 402. The PCell may perform PCell functions for the UE 402. PCell functions may include receiving a PUCCH from the UE 402, performing a random access procedure (e.g., random access channel (RACH)) with the UE 402, transmitting a paging message to the UE 402 (e.g., to trigger RRC setup), transmitting system information (e.g., a SIB or MIB) to the UE 402, performing beam failure recovery with the UE 402, and/or performing radio link monitoring with the UE 402. In another example, the base station 404 may configure one cell of the active set 420 to serve as a PUCCH secondary cell (SCell) for the UE 402. The UE 402 may be configured with two PUCCH groups. The PUCCH SCell may receive the PUCCH for the second PUCCH group from the UE 402. Note, although the PUCCH SCell may not be a PCell, the term "PCell function" as used herein includes a UE transmitting a PUCCH, such as a PUCCH for the second PUCCH group for the UE, to a PUCCH SCell and also includes the PUCCH SCell receiving the PUCCH from the UE.

When the cells in the active set 420 of serving cells changes (e.g., based on new L1 and/or L2 measurements), the cell assigned as the PCell or the PUCCH SCell may change. In order to perform a function or functions handled by the PCell or PUCCH SCell, the UE 402 may determine which cell of the active set 420 of serving cells is currently configured as the PCell or PUCCH SCell. In some aspects, the base station 404 may transmit a L1 or L2 signal to the UE 402 identifying which cell of the active set 420 is configured as the PCell or the PUCCH SCell (e.g., without transmitting a layer 3 (L3) signal such as a RRC message identifying the cell to the UE 402). In some aspects, the UE 402 may determine (e.g., implicitly determine) which cell of the active set 420 is configured as the PCell or the PUCCH SCell based on a rule (e.g., a preconfigured rule). For example, the base station 404 may utilize a common rule to determine which cell of the active set 420 of serving cells will be configured as the PCell or will be configured as the PUCCH SCell upon configuring the active set 420, and the UE 402 may utilize the common rule to determine the cell without indication from the base station 404. The rule is a common rule in the sense that both the base station 404 and the UE 402 are aware of the rule and is therefore known by or common to both. The term "common rule," as used herein, refers to a rule that is known by or common to both the UE and the base station.

Figure 5:
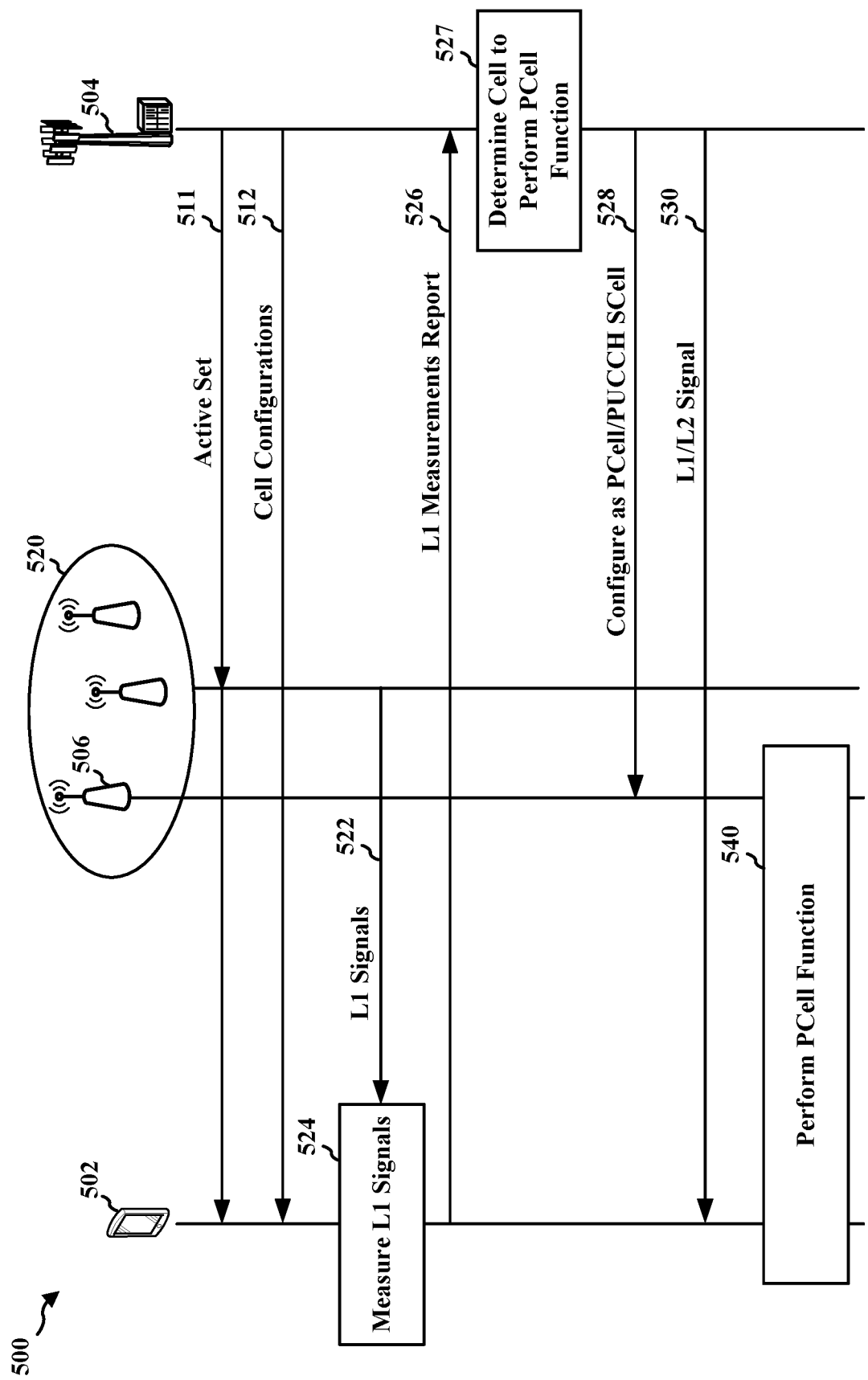
FIG. 5 is a communication flow diagram illustrating a UE determining a cell based on L1 or L2 signaling from a base station.

FIG. 5 is a communication flow diagram 500 illustrating a UE 502 determining a cell based on L1 or L2 signaling from a base station 504.

The base station 504 may configure the UE 502 with a configured cell set. The base station 504 may transmit cell configurations 512 for the configured cell set to the UE 502. The base station 504 may transmit the cell configurations 512 directly to the UE 502, or the cell configurations 512 may be relayed to the UE 502 by one or more cell of the configured cell set. The UE 502 may measure L1 signals (e.g., L1 reference signals) from the cells in the configured cell set and may report the measurements to the base station 504. Based on the measurements, the base station 504 may determine an active set 520 of serving cells for the UE 502 from the configured cell set, and may transmit an indication 511 of the cells in the active set to the UE 502 and to the cells of the active set 520 (e.g., may configure the cells of the active set 520 to serve the UE 502).

The cells of the active set 520 of serving cells may transmit L1 signals (e.g., L1 reference signals) to the UE 502. As illustrated at 524, the UE 502 may measure the L1 signals to generate L1 measurements for the cells of the active set 520. For example, the UE 502 may measure the L1 reference signal received power (RSRP), the L1 Signal-to-interference-plus-noise ratio (SINR), the L1 reference signal received quality, or a combination thereof. The UE 502 may transmit a L1 signal measurements report 526 including the L1 measurements to the base station 504. In some aspects, the UE 502 may transmit the L1 measurements report 526 directly to the base station 504

The base station 504 may receive the L1 measurements report 526. As illustrated at 527, based on the received L1 measurements report 526, the base station 504 may determine (e.g., select) a cell 506 from the active set 520 of serving cells to be a cell to perform one or more PCell functions for the UE 502. In some aspects, the PCell function may be one or more PCell functions (e.g., receiving a PUCCH from the UE 502, performing a random access procedure with the UE 502, transmitting a paging message to the UE 502, transmitting system information to the UE 502, performing beam failure recovery with the UE 502, and/or performing radio link monitoring with the UE 502), and the base station 504 may determine that the cell 506 will serve as the PCell for the UE 502. In some aspects, the PCell function may be receiving a PUCCH from the second PUCCH group for the UE 502, and the base station 504 may determine that the cell 506 will serve as the PUCCH SCell for the UE 502. As illustrated at 528, the base station 504 may configure the determined cell 506 to perform the PCell function or functions for the UE 502 (e.g., configure the cell 506 as a PCell or as a PUCCH SCell for the UE 502).

In some aspects, the base station 504 may initiate determining the cell 506 at 527 based on a change of the cells assigned to the active set 520 of serving cells. For example, the base station 504 may initiate determining the cell 506 at 527 based on determining that a previously configured PCell or SCell for the UE 502 is no longer in the active set 520. In some aspects, the base station 504 may initiate determining the cell 506 at 527 based on receiving the L1 signal measurements report 526. In some aspects, the base station 504 may initiate determining the cell 506 at 527 based upon the measurements in the L1 signal measurements report 526 changing with respect to previous measurements. For example, if the measurements for a cell previously configured as a PCell or a PUCCH SCell for the UE 502 drop below a certain level, or exhibit a change from previous measurements for that cell (e.g., lower by a certain percentage or lower by a certain magnitude), the base station 504 may evaluate assigning a new PCell or PUCCH SCell by initiating determining the cell 506 at 527. In some aspects, the base station 504 may initiate determine the cell 506 at 527 based upon the L1 signal measurements 526 indicating that a new cell in the active cell group may offer better performance as a PCell or a PUCCH SCell than a previously configured PCell or PUCCH SCell (e.g., if the measurement for the cell 506 is higher than the measurement for the previously configured PCell or PUCCH SCell).

The base station 504 may transmit an indicator of the determined cell 506 to the UE 502 in a L1 signal or an L2 signal 530. In some aspects, the L1 or L2 signal 530 may be transmitted directly from the base station 504 to the UE 502. In some aspects, the base station 504 may not transmit an indication of which cell was selected as the cell 506 to the UE 502 other than the indication transmitted in the L1 or L2 signal 530. For example, the UE 504 may transmit the indication of the determined cell 506 in the L1 or L2 signal 530 without transmitting an indication of the determined cell 506 in a layer 3 (L3) signal (e.g., a RRC message).

Upon receiving the indication of the cell 506 in the L1 or L2 signal 530, the UE 502 may perform the PCell function with the cell 506 as illustrated at 540. Where the cell 506 is the PCell for the UE 502, the UE 502 may perform a PCell function or multiple PCell functions with the cell 506. Where the cell 506 is a PUCCH SCell for the UE 502, the UE 502 may transmit a PUCCH (e.g., a PUCCH for the second PUCCH group) to the cell 506.

Upon receiving the indication of the cell 506 in the L1 or L2 signal 530, the UE 502 may load a cell configuration for the cell 506, received previously from the base station 504 with the cell configurations 512 of the configured cell set, and may utilize the cell configuration for the cell 506 to perform the PCell function as illustrated at 540. For example, where the cell 506 is a PCell for the UE 502, the cell configuration for the cell 506 may include random access channel resources which the UE 502 may utilize to perform a random access procedure with the cell 506, may include PUCCH resources which the UE 502 may utilize to transmit a PUCCH (e.g., a PUCCH for the first PUCCH group) to the cell 506, or may include beam failure detection reference signal resources which the UE 502 may utilize for beam failure detection with the cell 506. Where the cell 506 is a PUCCH SCell for the UE 502, the cell configuration for the cell 506 may include PUCCH resources which the UE 502 may utilize to transmit a PUCCH (e.g., a PUCCH for the second PUCCH group) to the cell 506.

In some aspects, the base station 504 may configure both a PCell and a PUCCH SCell for the UE 502 contemporaneously. For example, based on the measurements in the L1 measurements report 526, the base station 504 may determine two cells from the active set 520 of serving cells for the UE 502: a PCell to perform PCell functions for the UE 502, and a PUCCH SCell to perform PUCCH SCell functions for the UE 502. The base station 504 may configure the respective cells to serve as the PCell and the PUCCH SCell for the UE 502 at 528, and may include indications of both cells in the L1 or L2 signal 530.

FIG. 6 is a communication flow diagram 600 illustrating a UE 602 determining a cell based on a common rule, e.g., a rule that is common to both the base station 602 and the UE 602. The base station 604 may configure the UE 602 with a configured cell set. The base station 604 may transmit cell configurations 612 for the configured cell set to the UE 602. The UE 602 may measure L1 signals (e.g., L1 reference signals) from the cells in the configured cell set and may report the measurements to the base station 604. Based on the measurements, the base station 604 may determine an active set 620 of serving cells for the UE 602 from the configured cell set, and may transmit an indication 611 of the cells in the active set to the UE 602 and to the cells of the active set 620 (e.g., may configure the cells of the active set 620 to serve the UE 602).

As illustrated at 622, the base station 604 may determine (e.g., select) a cell 606 from the active set 620 of serving cells to be a cell 606 to perform one or more PCell function for the UE 602 based on a rule. In some aspects, the PCell function may be one or more PCell function (e.g., as described above with respect to 622), and the base station 604 may determine that the cell 606 will serve as the PCell for the UE 602. In some aspects, the PCell function may be receiving a PUCCH from the second PUCCH group for the UE 602, and the base station 604 may determine that the cell 606 will serve as the PUCCH SCell for the UE 602. The base station 604 may initiate determining the cell 606 at 622 in response to configuring or reconfiguring the active set 620 of serving cells for the UE 602.

The rule may be a common rule, known by both the base station 604 and the UE 602 (e.g., both the base station 604 and the UE 602 may be configured to utilize the common rule). The rule may be predefined or preconfigured at the base station 604. In some aspects, the rule may utilize information known to both the base station 604 and the UE 602 to determine which cell of the active group 620 will be selected as the cell 606 to perform the PCell function or functions. In some aspects, the rule may be based on the serving cell indices or PCIs of the active cell group 620. For example, in some aspects, the base station 604 may determine the cell 606 to be the cell in the active group 620 with the highest serving cell index or PCI, or to be the cell in the active group 620 with the lowest serving cell index or PCI. In some aspects, a preconfigured formula may be applied to the serving cell indices or PCIs of each cell in the active group 620 to generate a value for each cell, and the base station 604 may determine the cell 606 to be the cell in the active group 620 with the highest or lowest value. For example, the value for a cell may be the modulus of the serving cell index or PCI divided by 16, and if two cells both share the same value, the cell with the highest or lowest serving cell index or PCI may be selected. This approach may prevent disproportionately assigning cells with high or low serving cell indices or PCIs to serve as PCells or PUCCH SCells.

In some aspects, the rule may account for whether the base station 604 has transmitted a configuration to the UE 602 for the cells of the active set 620 (or, with respect to 630 below, whether the UE 602 has a configuration for the cells of the active set 620). For example, where the base station 604 is determining a PCell for the UE 602, the rule may exclude cells of the active set 620 for which the base station 604 has not transmitted a PCell configuration to the UE 602 (e.g., in the cell configurations 612). Where the base station 604 is determining a PUCCH SCell for the UE 602, the rule may exclude cells of the active set 620 for which the base station 604 has not transmitted a PUCCH resource configuration to the UE 602, or has not transmitted a PUCCH resource configuration for the second PUCCH group to the UE 602 (e.g., in the cell configurations 612).

In some aspects, the rule may account for whether the cells of the active set 620 are already configured as a different type of cell for the UE 602. For example, where the base station 604 is determining a PUCCH SCell for the UE 602, the rule may exclude cells of the active set 620 which are configured as a PCell for the UE 602.

As illustrated at 624, the base station 604 may configure the determined cell 606 to perform the PCell function for the UE 602 (e.g., configure the cell 606 as a PCell or as a PUCCH SCell for the UE 602).

As illustrated at 630, the UE 602 may determine the cell 606 from the active set 620. The UE 602 may determine the cell 606 at 630 in response to receiving the indication 611 of the active set 620. The UE 602 may determine the cell 606 from the active set 620 based on the common rule used by the base station 604 at 622, and may do so as described above with respect to 622. In some aspects, the rule may be predefined or preconfigured at the UE 602 as well as the base station 604. In some aspects, the base station may transmit the cell determination rule 623 to the UE 602, and the UE 602 may receive and store the rule. For example, the base station 604 may transmit the cell determination rule 623 with the cell configurations 612 or contemporaneously with the cell configurations 612. As the UE 602 determines the cell 606 from the active set 620 based on the same common rule used by the base station 604 to determine the cell 606 from the active set 620, the UE 602 may perform one or more PCell function with the cell 606 without waiting to receive an indication of the cell 606 from the base station 604.

Upon determining the cell 606 based on the rule, the UE 602 may perform the PCell function with the cell 606 as illustrated at 606. Where the cell 606 is the PCell for the UE 602, the UE 602 may perform a PCell function or multiple PCell functions with the cell 606. Where the cell 606 is a PUCCH SCell for the UE 602, the UE 602 may transmit a PUCCH (e.g., a PUCCH for the second PUCCH group) to the cell 606.

Upon determining the cell 606 based on the rule, the UE 602 may load a cell configuration for the cell 606, received previously from the base station 604 with the cell configurations 612 of the configured cell set, and may utilize the cell configuration for the cell 606 to perform the PCell function as illustrated at 640. For example, where the cell 606 is a PCell for the UE 602, the cell configuration for the cell 606 may include random access channel resources which the UE 602 may utilize to perform a random access procedure with the cell 606, may include PUCCH resources which the UE 602 may utilize to transmit a PUCCH (e.g., a PUCCH for the first PUCCH group) to the cell 606, or may include beam failure detection reference signal resources which the UE 502 may utilize for beam failure detection with the cell 606. Where the cell 606 is a PUCCH SCell for the UE 602, the cell configuration for the cell 606 may include PUCCH resources which the UE 602 may utilize to transmit a PUCCH (e.g., a PUCCH for the second PUCCH group) to the cell 606.

In some aspects, the base station 604 may configure both a PCell and a PUCCH SCell for the UE 602 contemporaneously. For example, based on a common rule which determines two cells from the active set 620, the base station 604 may determine a PCell to perform PCell functions for the UE 602 and a PUCCH SCell to perform PUCCH SCell PCell functions for the UE 602. The base station 604 may configure the respective cells to serve as the PCell and the PUCCH SCell for the UE 602 at 624. The UE 602 may similarly use the common rule to determine the two cells and perform PCell functions with the corresponding cells. The UE 602 may perform the PCell functions with the determined cells without receiving explicit indication of the cells from the base station 604.

FIG. 7 is a flowchart 700 of a method of wireless communication. The method may be performed by a UE (e.g., the UE 104, 402, 502, 602).

At 702, the UE may determine an active set of serving cells from a configured cell set. In some aspects, the UE may receive layer 1 reference signals from the cells of the configured cell set. The active set of serving cells may be determined from the configured cell set based on measurements of the received layer 1 reference signals. The UE may transmit a measurement report to the base station, the measurement report being based on the received layer 1 reference signals, may receive an indication of the active set of serving cells from the base station, and may determine the active set of serving cells based on the indication.

At 704, the UE may determine a cell of the active set of serving cells configured to perform a PCell function for the UE based on layer 1 or layer 2 signaling from a base station or based on a common rule. The cell may be a PUCCH SCell serving the UE, and the PCell function may be transmitting a PUCCH to the PUCCH SCell. The cell may be a PCell serving the UE, and the PCell function may be transmitting a PUCCH to the cell, performing a random access channel procedure with the cell, receiving a paging message from the cell, receiving system information from the cell, performing beam forming recovery with the cell, or performing radio link monitoring with the cell. The base station may be configured to configure the active set of serving cells to serve the UE.

In some aspects, the UE may determine the cell of the active set of serving cells based on the layer 1 or layer 2 signaling from the base station. The UE may receive the layer 1 or layer 2 signaling from the base station, and the layer 1 or layer 2 signaling may include an indicator identifying the cell.

In some aspects, the UE may determine the cell of the active set of serving cells based on the common rule. The base station may be configured to utilize the common rule to select the cell from the active set of serving cells to perform the PCell function for the UE. The UE may determine the cell of the active set of serving cells based on the common rule by selecting the cell based on serving cell indices or physical cell identifiers of the cells of the active set of serving cells. The UE may determine that the cell has the highest serving cell index or physical cell identifier of the active set of serving cells or may determine that the cell has the lowest serving cell index or physical cell identifier of the active set of serving cells.

In some aspects, the UE may determine a subset of cells of the active set of serving cells, the subset of cells being the cells of the active set of serving cells with a corresponding configuration for performing the PCell function at the UE, and may select the cell from the subset of cells based on the serving cell indices or the physical cell identifiers of the cells of the subset of cells.

In some aspects, the UE may determine a subset of cells of the active set of serving cells, the subset of cells comprising the cells of the active set of serving cells that are not serving as a primary cell for the UE, and may select the cell from the subset of cells based on the serving cell indices or the physical cell identifiers of the cells of the subset of cells.

In some aspects, the UE may determine a subset of cells of the active set of serving cells, the subset of cells being the cells of the active set of serving cells with a corresponding PUCCH resource configuration at the UE, may determine a second subset of cells of the subset of cells, the second subset of cells being the cells of the subset of cells that are not serving as a PCell for the UE, and may select the cell from the second subset of cells based on the serving cell indices or the physical cell identifiers of the cells of the second subset of cells.

At 706, the UE may perform the PCell function with the determined cell. In some aspects, the UE may receive a configuration for each serving cell of the active set of serving cells, and the UE may perform the PCell function with the cell based on the configuration for the cell.

FIG. 8 is a flowchart 800 of a method of wireless communication. The method may be performed by a base station (e.g., the base station 102/180, 404, 504, 604).

At 802, the base station may determine an active set of serving cells for a UE from a configured cell set for the UE. The base station may receive a measurement report from the UE, and the measurement report may be based on layer 1 reference signals received by the UE from the cells of the configured cell set. The active set of serving cells may be determined from the configured cell set based on measurement report.

In some aspects, the base station may transmit a configuration for each serving cell of the active set of serving cells to the UE.

In some aspects, at 804, the base station may select a cell from the active set of serving cells to perform a PCell function for the UE based on a common rule. The UE may be configured to utilize the common rule to determine the cell from the active set of serving cells.

Selecting the cell from the active set of serving cells based on the common rule may include selecting the cell from the active set of serving cells based on the serving cell indices or the physical cell identifiers of the cells of the active set of cells. Selecting the cell based on the serving cell indices or the physical cell identifiers of the cells of the active set of cells may include determining that the cell has the highest serving cell index or physical cell identifier of the active set of serving cells or determining that the cell has the lowest serving cell index or physical cell identifier of the active set of serving cells.

In some aspects, selecting the cell from the active set of serving cells based on the common rule may include determining a subset of cells of the active set of serving cells, the subset of cells being the cells of the active set of serving cells with a corresponding PCell configuration that the base station has transmitted to the UE, and selecting the cell from the active set of serving cells based on the serving cell indices or the physical cell identifiers of the cells of the active set of cells. Selecting the cell based on the serving cell indices or the physical cell identifiers of the cells of the active set of serving cells may include determining that the cell has the highest serving cell index or physical cell identifier of the active set of serving cells or determining that the cell has the lowest serving cell index or physical cell identifier of the active set of serving cells.

In some aspects, selecting the cell from the active set of serving cells based on the common rule may include determining a subset of cells of the active set of serving cell, the subset of cells being the cells of the active subset of serving cells that the base station has not configured as a PCell for the UE, and selecting the cell from the subset of cells based on the serving cell indices or the physical cell identifiers of the cells of the subset of cells.

In some aspects, selecting the cell from the active set of serving cells based on the common rule may include determining a subset of cells of the active set of serving cells, the subset of cells being the cells of the active set of serving cells with a corresponding PUCCH resource configuration that the base station has transmitted to the UE, determining a second subset of cells of the subset of cells, the second subset of cells being the cells of the subset of cells that the base station has not configured as a PCell for the UE, and selecting the cell from the second subset of cells based on the serving cell indices or the physical cell identifiers of the cells of the second subset of cells.

The cell may be a PCell to serve the UE and the PCell function may be receiving a physical uplink control channel from the UE, performing a random access channel procedure with the UE, transmitting a paging message to the UE, transmitting system information to the UE, performing beam forming recovery with the UE, or performing radio link monitoring with the UE. The cell may be a PUCCH SCell to serve the UE, the PCell function may be receiving a PUCCH from the UE, and configuring the cell to perform the PCell function for the UE may be configuring the cell as the PUCCH SCell for the UE.

In some aspects, at 806, the base station may select the cell from the active set of serving cells to perform the PCell function for the UE and may transmit an indication of the cell to the UE through layer 1 or layer 2 signaling.

At 808, the base station may configure the cell to perform the PCell function for the UE. The base station may configure the cell to perform the PCell function for the UE by configuring the cell as the PCell for the UE.

Figure 9:
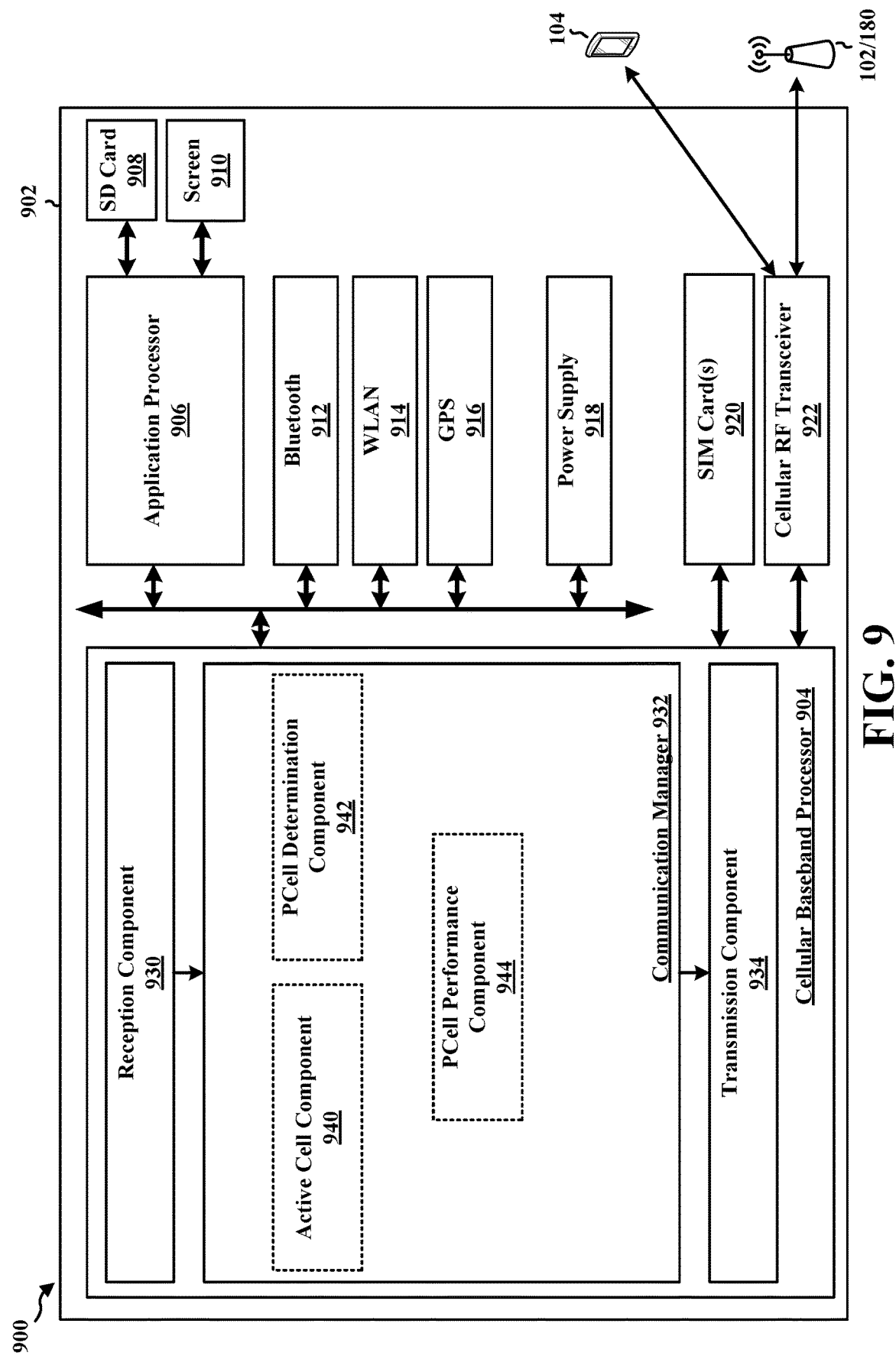
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes an active cell component 940 that is configured to determine an active set of serving cells from a configured cell set, e.g., as described in connection with 702 of FIG. 7. The communication manager 932 further includes a PCell determination component 942 that is configured to determine a cell of the active set of serving cells configured to perform a PCell function for the UE based on layer 1 or layer 2 signaling from a base station or based on a common rule, e.g., as described in connection with 704 of FIG. 7. The communication manager 932 further includes a PCell performance component 944 that is configured to perform the PCell function with the determined cell, e.g., as described in connection with 706 of FIG. 7.

The apparatus may include additional components that perform each of the blocks of the algorithm in the aforementioned flowcharts of FIG. 7. As such, each block in the aforementioned flowcharts of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for determining an active set of serving cells from a configured cell set, means for determining a cell of the active set of serving cells configured to perform a primary cell (PCell) function for the UE based on layer 1 or layer 2 signaling from a base station or based on a common rule, and means for performing the PCell function with the determined cell. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
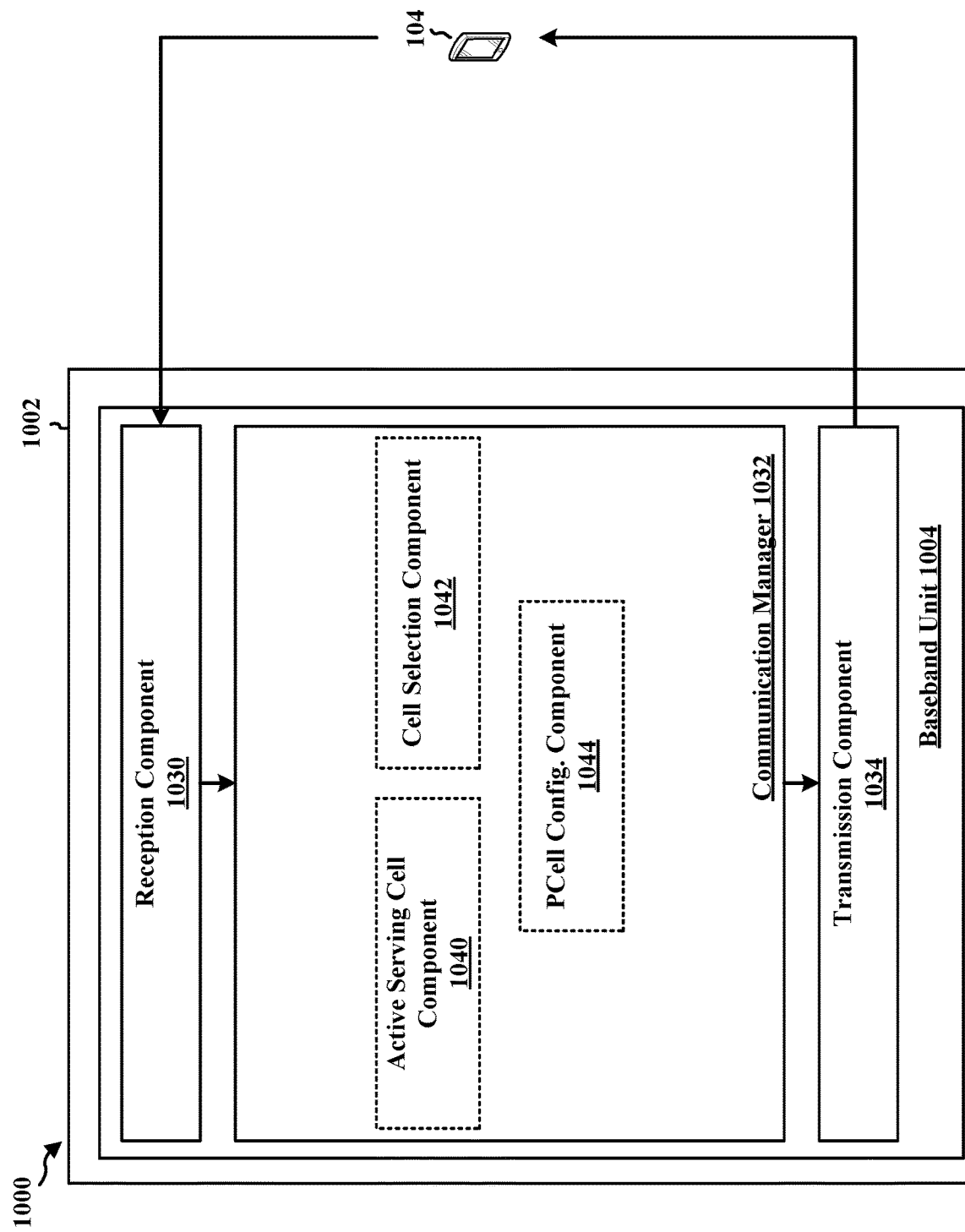
FIG. 10 is a diagram illustrating another example of a hardware implementation for another example.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes an active serving cell component 1040 that is configured to determine an active set of serving cells for a UE from configured cell set for the UE, e.g., as described in connection with 802 of FIG. 8. The communication manager 1032 further includes a cell selection component 1042 that is configured to select a cell from the active set of serving cells to perform a PCell function for the UE based on a common rule, e.g., as described in connection with 804 of FIG. 8, and/or select the cell from the active set of serving cells to perform the PCell function for the UE and may transmit an indication of the cell to the UE through layer 1 or layer 2 signaling, e.g., as described in connection with 806 of FIG. 8. The communication manager 1032 further includes a PCell configuration component 1044 that is configured to configure the cell to perform the PCell function for the UE. The base station may configure the cell to perform the PCell function for the UE by configuring the cell as the PCell for the UE, e.g., as described in connection with 808 of FIG. 8.

The apparatus may include additional components that perform each of the blocks of the algorithm in the aforementioned flowcharts of FIG. 8. As such, each block in the aforementioned flowcharts of FIG. 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for determining an active set of serving cells for a user equipment (UE) from a configured cell set for the UE, means for selecting a cell from the active set of serving cells to perform a primary cell (PCell) function for the UE based on a common rule, or means for selecting the cell from the active set of serving cells to perform the PCell function for the UE and transmitting an indication of the cell to the UE through layer 1 signaling, and means for configuring the cell to perform the PCell function for the UE. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    determining an active set of serving cells from a configured cell set;
    receiving, from a base station, layer 2 signaling identifying a secondary cell (SCell) serving the UE, from among the active set of serving cells, to perform a primary cell (PCell) function for the UE; and
    performing the PCell function with the identified SCell.

2. The method of claim 1, further comprising receiving layer 1 reference signals from cells of the configured cell set, wherein the active set of serving cells is determined from the configured cell set based on measurements of the received layer 1 reference signals.

3. The method of claim 2, further comprising:
    transmitting a measurement report to the base station, the measurement report being based on the received layer 1 reference signals;
    receiving an indication of the active set of serving cells from the base station; and
    determining the active set of serving cells based on the indication.

4. The method of claim 1, wherein the SCell is a physical uplink control channel (PUCCH) SCell serving the UE, and wherein performing the PCell function comprises transmitting a PUCCH to the PUCCH SCell.

5. The method of claim 1, further comprising receiving a configuration for each serving cell of the active set of serving cells, wherein performing the PCell function comprises performing the PCell function based on the configuration for the SCell.

6. An apparatus for wireless communication at a user equipment (UE), comprising:
a memory; and
at least one processor coupled to the memory and configured to:
determine an active set of serving cells from a configured cell set;
receive, from a base station, layer 2 signaling identifying a secondary cell (SCell) serving the UE, from among the active set of serving cells, to perform a primary cell (PCell) function for the UE; and
perform the PCell function with the identified SCell.

7. The apparatus of claim 6, further comprising:
a transceiver coupled to the at least one processor, wherein the at least one processor is further configured to receive, via the transceiver, layer 1 reference signals from cells of the configured cell set, wherein the active set of serving cells is determined from the configured cell set based on measurements of the received layer 1 reference signals.

8. The apparatus of claim 7,
wherein the at least one processor is further configured to:
transmit, via the transceiver, a measurement report to the base station, the measurement report being based on the received layer 1 reference signals;
receive an indication of the active set of serving cells from the base station; and
determine the active set of serving cells based on the indication.

9. The apparatus of claim 6, wherein the SCell is a physical uplink control channel (PUCCH) SCell serving the UE, and wherein the at least one processor is configured to perform the PCell function by transmitting a PUCCH to the PUCCH SCell.

10. A method of wireless communication at a base station, comprising:
determining an active set of serving cells for a user equipment (UE) from a configured cell set for the UE;
selecting a secondary cell (SCell) serving the UE, from among the active set of serving cells, to perform a primary cell (PCell) function for the UE;
transmitting an indication of the SCell to the UE through layer 2 signaling; and
configuring the SCell to perform the PCell function for the UE.

11. The method of claim 10, further comprising:
receiving a measurement report from the UE, the measurement report being based on layer 1 reference signals received by the UE from cells of the configured cell set; and
determining the active set of serving cells from the configured cell set based on the measurement report.

12. The method of claim 11, further comprising transmitting an indication of the active set of serving cells to the UE.

13. The method of claim 10, wherein the SCell is a physical uplink control channel (PUCCH) SCell serving the UE, and wherein configuring the SCell to perform the PCell function comprises configuring the SCell to receive a PUCCH from the UE.

14. The method of claim 10, further comprising transmitting, to the UE, a configuration for each serving cell of the active set of serving cells.

15. An apparatus for wireless communication at a base station comprising:
a memory; and
at least one processor coupled to the memory and configured to:
determine an active set of serving cells for a user equipment (UE) from a configured cell set for the UE;
select a secondary cell (SCell) serving the UE, from among the active set of serving cells, to perform a primary cell (PCell) function for the UE;
transmit signaling identifying the SCell to the UE through layer 2 signaling; and
configure the SCell to perform the PCell function for the UE.

16. The apparatus of claim 15, the at least one processor further configured to:
receive a measurement report from the UE, the measurement report being based on layer 1 reference signals received by the UE from cells of the configured cell set; and
determining the active set of serving cells from the configured cell set based on the measurement report.

17. The method of claim 16, the at least one processor further configured to transmit an indication of the active set of serving cells to the UE.

18. The method of claim 15, wherein the SCell is a physical uplink control channel (PUCCH) SCell serving the UE, and wherein the at least one processor is configured to configure the SCell to receive a PUCCH from the UE.

19. The method of claim 15, the at least one processor further configured to transmit, to the UE, a configuration for each serving cell of the active set of serving cells.

* * * * *